April 3, 1951      S. GREENSTEIN      2,547,262
MULTIPLE DRY CELL BATTERY
Filed Aug. 23, 1948
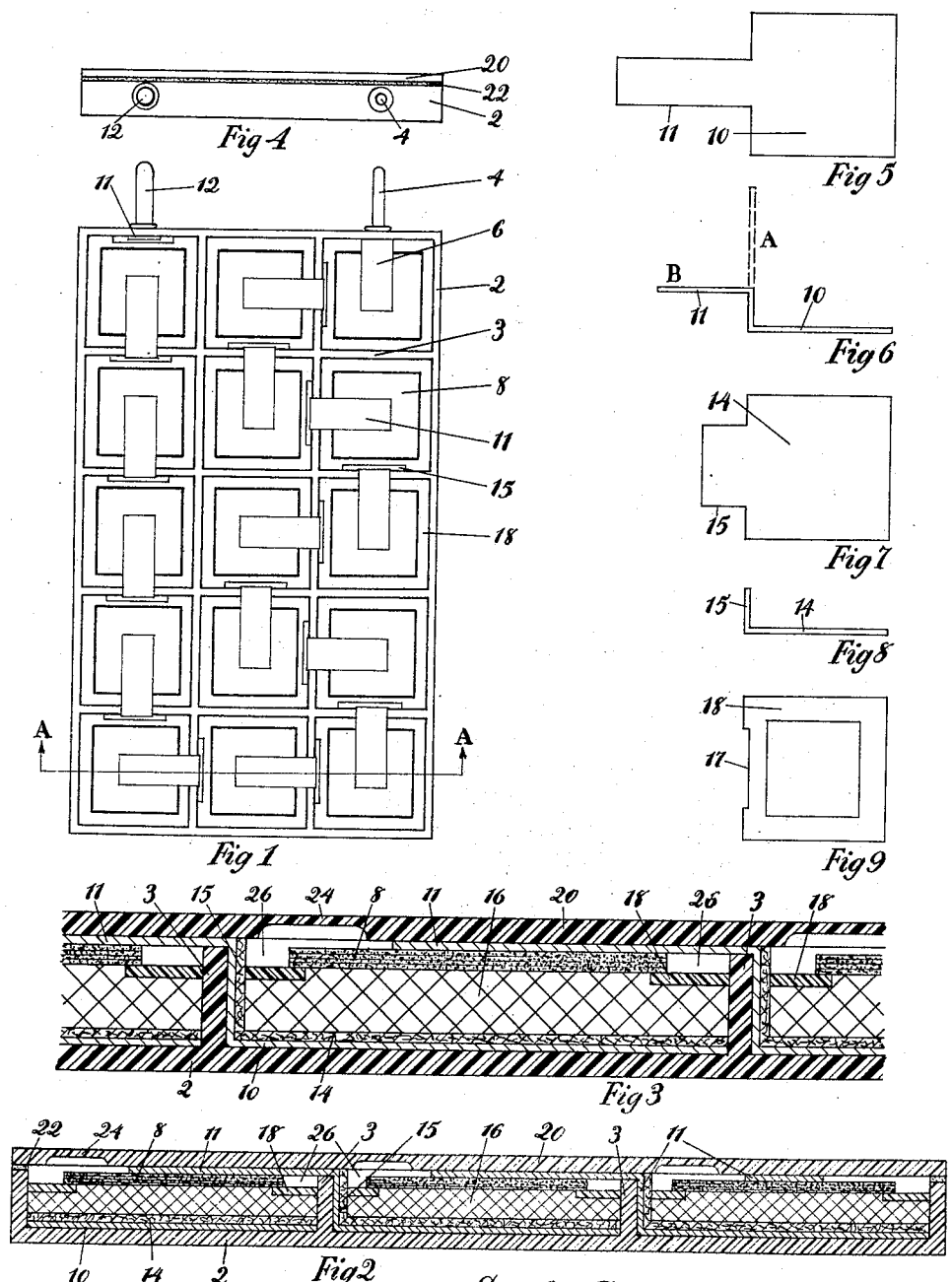
Saul Greenstein INVENTOR.
BY Arthur McIlroy
ATTORNEY Patented Apr. 3, 1951

2,547,262

UNITED STATES PATENT OFFICE 2,547,262

MULTIPLE DRY CELL BATTERY

Saul Greenstein, Philadelphia, Pa., assignor of one-eighth to Arthur McIlroy, Gladwyne, Pa.

Application August 23, 1948, Serial No. 45,659

10 Claims. (Cl. 136—108)

My invention relates to a novel compact flat multiple unit dry-cell battery having the various cells constructed in a manner such that the complete unit, when assembled, is wafer-like in appearance owing to the fact that the individual cells are horizontally disposed throughout a built up battery.

Built up batteries consisting of a series of Leclanche cells have been used for many years in radio receivers, hearing aids, radio transmitters, etc. Because of the present methods of construction, they are expensive, heavy, unduly large and difficult to construct in shapes and sizes required for numerous purposes. Also, such dry cells require an amount of zinc considerably in excess of that needed for their efficient operation. In the batteries produced at present many of them depend upon the zinc electrode to serve as a container. This container is usually in the form of a cup that must be of rather heavy metal in order to give sufficient rigidity and strength to the individual cells. Other cells presently available are built up in layers. In batteries of such construction considerable quantities of zinc are saved; however, the metal must be thicker than required electrically in order that subsequent contraction of the plastic or similar material used in construction of the cell will not misshape it. These bands are awkward to handle in the process of manufacturing such dry-cells and increase the cost of the battery considerably. Furthermore, many of the dry-cells on the market at present, especially cylindrical unit cells, require relatively large amounts of soldering in their manufacture. One of the chief difficulties in the construction of built up batteries now available is their bulkiness and thickness which, as a result, render them awkward to use in instances where the conservation of space is highly desirable, as, for example, in the case of hearing aid batteries. This undesirable construction is due to the fact that the batteries, per force, must be made by stacking separate units, one on the other, to establish a series connection. These units consist of a sheet of zinc coated on one side with carbon and on the reverse side with an electrolyte which is in turn next to a layer of depolarizing mix. Thus, it may be seen that such units do not constitute a complete cell, but are only capable of functioning as a battery when superimposed one upon the other. Built up batteries, presently available, must be impregnated with either asphalt or a suitable wax; also, they require elaborate cardboard grids as well as impregnated cardboard cases. In the past, it has been the unfortunate experience of the military and others to discover that dry-cells of the type now available as well as built up dry-cell batteries, give very poor service in the tropics. The service rendered by such batteries is slightly better in those climates that are hot and humid than those that are hot and dry. In order to combat the deleterious effects of such undesirable climatic conditions, ordinary dry-cells were sprayed and covered with a suitable plastic coating material to allow the batteries to be shipped to the tropics and stored without excessive deterioration. However, once the temporary protective coating was taken off, the batteries seemed to deteriorate rapidly.

It is an object of my invention to provide a compact flat multiple dry-cell battery having a plurality of cavities arranged in a horizontal plane within a plastic case and containing individual dry-cells in each of such cavities, each of the dry-cells comprising a thin negative electrode wholly supported by and snugly fitted within the cavity and contacting the carbon electrode of an adjoining dry-cell, an electrolyte in contact with the negative electrode, a depolarizing mix between the electrolyte and the carbon electrode of the cell which is in electrical contact with the negative electrode of an adjoining cell, a nonconductive retaining washer resting on the depolarizing mix, and a waterproof, gas permeable cover for the plastic or equivalent casing whereby the elimination of hydrogen and other gases from the cells is facilitated.

It is a further object of my invention to provide a multiple dry-cell battery which requires substantially only that amount of zinc electrically needed for the practical life of such batteries by employing that or a similarly suitable electrode metal in the form of foil having a thickness of from about .002 to about .005 inch.

It is a still further object of my invention to provide a light wafer-thin battery requiring no heavy solder and which is completely sealed and leak proof, and capable of allowing the gases generated by operation of the battery to diffuse thru the plastic casing and/or cover.

It is a further object of my invention to provide a flat multiple dry-cell battery in which each individual unit therein constitutes a completely independent dry-cell and wherein at least one side of each unit or cavity containing a single cell serves as a common wall to support adjacent cells.

Other objects of my invention will be apparent from the accompanying drawings and the description which follows:

Referring to the drawings, Fig. 1 represents a plan view of the battery with the cover plate removed. This figure shows the grid layout within the battery case, and also indicates a manner in which the various cells may be connected to form the battery. Fig. 2 represents a section through the battery along line A—A of Fig. 1 with the cover plate in place. Fig. 3 is an enlargement of the center cell of Fig. 2 which is typical of all units in the battery. Fig. 4 shows a view of the battery at the terminal end. Fig. 5 is a plan view of the zinc foil negative electrode. Fig. 6 is an end view of the negative zinc electrode in Fig. 5. Position A in Fig. 6 shows the connecting lug bent up into the position retained while the battery elements are being inserted. Position B represents the final shape of the electrode within the finished battery. Fig. 7 is a plan view of the battery paper electrolyte retainer. Fig. 8 shows an end view of battery paper electrolyte retainer bent into the shape finally assumed in the battery. Fig. 9 is a plan view of the thin plastic retaining washer that is used to maintain the depolarizing mix in place.

In constructing the battery of my invention, a battery shell or case 2 with supporting partitions 3 molded therein is made from vinyl plastic, rubber or other suitable material. The positive terminal prong 4 is riveted into place making connection with metal connecting strap or lug 6. A modified zinc negative electrode 10 is then placed in the cavity into which the negative connecting prong 12 enters and the prong is riveted to modified lug 11 of electrode 10 making a firm electrical connection. The other negative zinc foil electrodes 10 cut as shown in Fig. 5 and bent as shown in Fig. 6 (position A) are dropped into place as shown in Fig. 1. Battery paper electrolyte retainers 14 punched out as shown in Fig. 7 are then dipped into a suitable electrolyte. Tabs 15 are then bent back as shown in Fig. 8 and retainers 14 are dropped into the individual cavities, being oriented in the same position as the foil negative electrode lugs. The tabs 15 on paper retainers 14 are wider than lugs 11 on negative electrodes 10 so as to protect the connecting lugs from coming into contact with the depolarizing mix and, thus short circuiting the battery. A tablet of depolarizing mix 16 is then dropped into each cell. Thereafter, the plastic retaining washers 18 punched from thin plastic sheets as shown in Fig. 9 having notches 17 to permit connecting lugs 11 and paper tabs 15 to fit snugly thereagainst, are then pressed into place with a mandrel that fits within the cell cavity. This depresses washers 18 and raises the depolarizing mix 16 until the top of the washer and depolarizing mix are level. Carbon buttons 8 are then dropped into place as shown in Figs. 1 and 3. These carbon buttons serve as the positive electrode. Lugs 11 on the zinc electrodes are then bent over as shown in Figs. 1, 3, and 6B so as to make contact with positive carbon button 8 of the adjoining cell. After all of the lugs are bent over, cover plate 20 is firmly cemented into place by means of an appropriate cement 22 or by means of a heat seal. Cover plate 20 is constructed of a suitable vinyl resin, such as for example, polymerized vinyl isobutyl ether. Plastics of this type have the property of being permeable to hydrogen and other gases and impervious to water vapor. In the construction of larger batteries it may be necessary to provide cover plates that are too thick to pass sufficient gas so that the batteries will not split apart from the gas pressure. Under such circumstances, gas escape diaphragms 24 should be employed. These diaphragms do not have to be very large in diameter. It may be required by the characteristics of individual cells to provide more than one escape diaphragm. Plastic cover 20 should be thinned down, under such circumstances, so that the thickness of the diaphragm is in the neighborhood of ½ m.m. to about 2 m.m. Air space 26 is provided for the collection of generated gases.

In construction of built up batteries in accordance with my invention, the zinc electrodes may vary in thickness from about .002 to about .01 inch. For the majority of purposes, however, I have found it satisfactory to use zinc electrodes varying in thickness of from about .003 to about .005 inch. In this connection the expression "thin negative electrode," appearing in the appended claims, is intended to refer to foil gauge metal which is generally regarded as being not in substantial excess of about .005 inch in thickness. The plastic case itself may be constructed of a number of commercially available plastics, such as for example, polystyrene, polyvinyl resins, methyl methacrylate, cellulose acetate and the like.

My battery is very economical to manufacture, inasmuch as a minimum of expensive materials is employed and the complete assembly can be finished in one operation rather than requiring the prior manufacture of individual cells and thereafter soldering and assembling them.

What I claim is:

1. A compact flat multiple dry-cell battery having circuit terminals, a plurality of cavities arranged in a horizontal plane within a casing and containing an individual complete dry-cell in each of said cavities, each of said dry-cells comprising a thin generally horizontally positioned negative electrode of uniform thickness adapted to be stamped to fit the interior contours of each of said cavities, said negative electrode contacting the generally horizontally positioned positive electrode of an adjoining dry-cell, an electrolyte in contact with said negative electrode, a depolarizing mix between said electrolyte and the positive electrode of said cell which is in electrical contact with an overlapping portion of the negative electrode of an adjoining cell, a non conducting retaining washer resting on said depolarizing mix and partially supporting said positive electrode, a water proof hydrogen permeable cover for said plastic casing whereby the elimination of hydrogen therefrom is facilitated.

2. In a compact flat multiple dry-cell battery, the combination comprising a positive and a negative circuit terminal, a plurality of cavities arranged in a horizontal plane within a casing and containing an individual complete dry-cell in each of said cavities, the latter having at least one side which serves as a common wall to support adjacent cells, each of said dry-cells comprising a generally horizontally positioned negative electrode adapted to be stamped to fit the interior contours of each of said cavities, said negative electrode contacting the generally horizontally positioned positive electrode of an adjoining dry-cell, an electrolyte in contact with said negative electrode, and a depolarizing mix between said electrolyte and said positive electrode which is in electrical contact with an overlapping portion of the negative electrode of an adjoining cell.

3. In a multiple dry cell battery, the combination comprising a positive and negative circuit terminal, a plurality of cavities arranged in a horizontal plane within a casing and containing an individual complete dry cell in each of said cavities, the latter having at least two adjoining sides which serve as a common wall to support adjacent cells each of said dry cells comprising a thin generally horizontally positioned negative electrode of uniform thickness adapted to be stamped to fit the interior contours of said cavity, said negative electrode contacting the generally horizontally positioned positive electrode of an adjoining dry cell, an electrolyte in contact with and supported by said negative electrode, and a depolarizing mix between said electrolyte and said positive electrode which is in electrical contact with an extending portion of the negative electrode in an adjoining cell.

4. In a multiple dry cell battery, the combination comprising a positive and a negative circuit terminal, a plurality of cavities arranged in a horizontal plane within a casing and containing an individual complete dry cell in each of said cavities, the latter having at least two adjoining sides which serve as a common wall to support adjacent cells, each of said dry cells comprising a generally horizontally positioned negative electrode adapted to be stamped to fit the bottom interior contours of each of said cavities, said negative electrode contacting the generally horizontally positioned positive electrode of an adjoining dry cell, an electrolyte in contact with said negative electrode, and a depolarizing mix between said electrolyte and said positive electrode which is in electrical contact with an overlapping portion of the negative electrode in an adjoining cell.

5. A compact flat multiple dry-cell battery having a positive and a negative circuit terminal, a plurality of cavities arranged in a horizontal plane within a casing and containing an individual complete dry-cell in each of said cavities, each of said dry-cells comprising a thin generally horizontally positioned negative electrode of uniform thickness adapted to be stamped to fit the interior contours of each of said cavities, said negative electrode contacting the generally horizontally positioned positive electrode of an adjoining dry-cell, an electrolyte in contact with said negative electrode, a depolarizing mix between said electrolyte and the positive electrode of said cell which is in electrical contact with an overlapping portion of the negative electrode of an adjoining cell, a non conducting retaining washer resting on said depolarizing mix, a water proof, hydrogen permeable cover for said plastic casing having a recess over each of said cells whereby the elimination of hydrogen therefrom is facilitated.

6. A compact flat multiple dry-cell battery having a positive and a negative circuit terminal, a plurality of cavities arranged in a horizontal plane within a plastic casing and containing an individual complete dry-cell in each of said cavities, each of said dry-cells comprising a thin generally horizontally positioned negative electrode of uniform thickness adapted to be stamped to fit the interior contours of each of said cavities, said negative electrode contacting the generally horizontally positioned positive electrode of an adjoining dry-cell, an electrolyte in contact with said negative electrode, a depolarizing mix between said electrolyte and the positive electrode of said cell which is in electrical contact with an overlapping portion of the negative electrode lug of an adjoining cell, a non conducting retaining washer resting on said depolarizing mix and partially supporting said positive electrode, a water proof, gas permeable plastic cover for said plastic casing having a recess over each of said cells whereby the elimination of gas therefrom is facilitated.

7. A compact flat multiple dry-cell battery having a positive and a negative circuit terminal, a plurality of cavities arranged in a horizontal plane within a casing and containing an individual complete dry-cell in each of said cavities, the latter having at least two adjoining sides which serve as a common wall to support adjacent cells, each of said dry-cells comprising a thin generally horizontally positioned negative electrode of uniform thickness adapted to be stamped to fit the interior contours of each of said cavities, said negative electrode contacting the generally horizontally positioned positive electrode of an adjoining dry-cell, an electrolyte in contact with an overlapping portion of said negative electrode, a depolarizing mix between said electrolyte and the positive electrode of said cell which is in electrical contact with the negative electrode of an adjoining cell, a non conducting retaining washer resting on said depolarizing mix and partially supporting said positive electrode, a water proof, gas permeable cover having a recess over each of said cells whereby the elimination of gas therefrom is facilitated.

8. A compact flat multiple dry-cell battery having a positive and a negative circuit terminal, a plurality of cavities arranged in a horizontal plane within a plastic casing and containing an individual complete dry-cell in each of said cavities, the latter having at least one side which serves as a common wall to support adjacent cells, each of said dry-cells comprising a thin generally horizontally positioned negative electrode of uniform thickness adapted to be stamped to fit the interior contours of each of said cavities, said negative electrode contacting the generally horizontally positioned positive electrode of an adjoining dry-cell, an electrolyte in contact with said negative electrode, a depolarizing mix between said electrolyte and the positive electrode of said cell which is in electrical contact with an overlapping portion of the negative electrode of an adjoining cell, a non conducting retaining washer resting on said depolarizing mix and partially supporting said positive electrode, a water proof, gas permeable cover having a recess over each of said cells whereby the elimination of gas therefrom is facilitated.

9. A compact flat multiple dry-cell battery having a positive and a negative circuit terminal, a plurality of cavities arranged in a horizontal plane within a plastic casing and containing an individual complete dry-cell in each of said cavities, the latter having at least one side which serves as a common wall to support adjacent cells, each of said dry-cells comprising a generally horizontally positioned negative electrode of uniform thickness adapted to be stamped to fit the interior contours of each of said cavities, said negative electrode contacting the generally horizontally positioned positive electrode of an adjoining dry-cell, an electrolyte in contact with said negative electrode, a depolarizing mix between said electrolyte and the positive electrode of said cell which is in electrical contact with an overlapping portion of the negative electrode of an adjoining cell, a non conducting retaining washer resting on said depolarizing mix and partially supporting said positive electrode, a water proof, gas permeable cover having a recess over each of said cells whereby the elimination of gas therefrom is facilitated.

10. The dry cell battery of claim 1 in which the gas permeable cover is constructed of polymerized vinyl isobutyl ether.

SAUL GREENSTEIN.

REFERENCES CITED

The following references are of record in the file of this patent:

UNITED STATES PATENTS

| Number | Name | Date |
|---|---|---|
| Re. 14,984 | French | Nov. 16, 1920 |
| 1,086,437 | Broad | Feb. 10, 1914 |
| 1,087,612 | Simons | Feb. 17, 1914 |
| 1,775,763 | Heise et al. | Sept. 16, 1930 |
| 1,916,709 | Zimmerman | July 4, 1933 |
| 2,178,969 | Ruben | Nov. 7, 1939 |
| 2,428,537 | Veszi et al. | Oct. 7, 1947 |
| 2,480,531 | Wilke | Aug. 30, 1949 |

FOREIGN PATENTS

| Number | Country | Date |
|---|---|---|
| 25,465 | Sweden | Nov. 23, 1906 |